US008636298B2

(12) United States Patent
Nimura

(10) Patent No.: US 8,636,298 B2
(45) Date of Patent: Jan. 28, 2014

(54) WHEELCHAIR

(76) Inventor: Yosiharu Nimura, Hokkaido (JP)

( * ) Notice: Subject to any disclaimer, the term of this patent is extended or adjusted under 35 U.S.C. 154(b) by 189 days.

(21) Appl. No.: 13/197,039

(22) Filed: Aug. 3, 2011

(65) Prior Publication Data

US 2012/0038128 A1 Feb. 16, 2012

(30) Foreign Application Priority Data

Aug. 12, 2010 (JP) ................................ 2010-180934
Dec. 17, 2010 (JP) ................................ 2010-282051

(51) Int. Cl.

| | |
|---|---|
| ***B62B 9/28*** | (2006.01) |
| ***B62B 9/08*** | (2006.01) |
| ***B62B 5/08*** | (2006.01) |
| ***A61G 5/14*** | (2006.01) |
| ***B62M 1/14*** | (2006.01) |

(52) U.S. Cl.
USPC ...... 280/650; 280/648; 280/304.1; 280/250.1

(58) Field of Classification Search
USPC ............... 280/250, 304.1, 648, 650; 297/350, 297/351, 353, 325, 326, 327, 311, 44, 16.1
See application file for complete search history.

(56) References Cited

U.S. PATENT DOCUMENTS

| | | | | |
|---|---|---|---|---|
| 5,145,197 | A * | 9/1992 | Gatti | 280/304.1 |
| 6,578,860 | B1 * | 6/2003 | Chang | 280/250.1 |
| 7,052,030 | B2 * | 5/2006 | Serhan | 280/304.1 |
| 7,628,411 | B2 * | 12/2009 | Meyers et al. | 280/87.021 |
| 7,686,324 | B2 * | 3/2010 | Nishi | 280/650 |
| 2007/0273124 | A1 | 11/2007 | Nishi | |
| 2013/0069344 | A1 * | 3/2013 | Moliner | 280/650 |

FOREIGN PATENT DOCUMENTS

| | | |
|---|---|---|
| JP | 07-163284 | 6/1995 |
| JP | 09215711 A * | 8/1997 |
| JP | 11-009625 | 1/1999 |
| JP | 2001-354055 | 12/2001 |
| JP | 2009-106692 | 5/2009 |
| JP | 4730859 B1 * | 7/2011 |
| WO | 2005-053592 | 6/2005 |

OTHER PUBLICATIONS

Preliminary rejection with abridged English translation thereof for Japanese Patent Application No. 180934/2010.

* cited by examiner

*Primary Examiner* — Paul N Dickson
*Assistant Examiner* — Daniel Yeagley
(74) *Attorney, Agent, or Firm* — Boyle Fredrickson, S.C.

(57) ABSTRACT

A wheelchair has a car body of which rear and bottom wall portion are opened, a seat to be divided into right and left portions, a device for moving the right or left portion of the seat, and a holding plate provided on the car body for holding the device for moving the portion of the seat. The device has a link for connecting the seat portion to the car body, and an operation rod for operating the link so that the seat portion is moved between an opened position and a closed position, respectively. Wheels for supporting the car body, brake for the wheel, a brake operation device for operating the brake, a device is provided for synchronously driving the seat moving device and the brake operation device.

2 Claims, 8 Drawing Sheets

WHEELCHAIR

BACKGROUND OF THE INVENTION

1. Field of the Invention

The present invention relates to a wheelchair, and more particularly, relates to a traveler type wheelchair having a seat, and a space formed under the seat of the wheelchair for receiving therein a movable bed for a disable person. The seat is divided into right and left seat portions, and at least one of the seat portions can be moved between a closed position where mutual opposite edges of the portions are faced with each other and an opened position where the mutual opposite edges of the portions are separated from each other, so that the disable person can be moved into the wheelchair and out of the wheelchair through the seat.

2. Description of the Related Art

A car having a seat divided into right and left portions which can be moved to the outside of the wheelchair is publicly known as shown in the Japanese Patent Application Laid-Open No. 354055/2001.

Further, a wheelchair having a seat which can be divided into two portions, the divided portions being able to move between a horizontal position and a vertical position is publicly known as shown in a publication of WO 2005/053592.

A chair for nursing care comprising a seat part and a backrest supported by a frame body, the seat part and the backrest being divided into right and left splits, in order to move between a closed position where mutual opposite edges are faced with each other and an opened position where mutual opposite edges are separated from each other, and the frame body being so formed that a care-receiver sitting on a pedestal such as a bed or a toilet seat can pass thereunder along with the pedestal between the frame body and the right and left splits when the right and left splits are opened is publicly known as shown in the Japanese Patent Application Laid-Open No. 106692/2009.

In the car shown in the Japanese Patent Application Laid-Open No. 354055/2001, however, it is difficult to move both of the seat and the bed with the disable person into the car.

The wheelchair shown in the publication of WO 2005/053592 is very complicated in structure and low in mechanical strength, because the seat is supported rotatably by a tip end of an L-shaped stay in order to move the seat vertically.

In the chair for nursing care shown in the Japanese Patent Application Laid-Open No. 106692/2009, the structure for dividing the seat into two parts along the guide frame is very complicated.

SUMMARY OF THE INVENTION

An object of the present invention is to provide a wheelchair comprising a car body, a seat to be divided into right and left seat portions, a rear wall of the car body and a bottom wall under the seat of the car body being opened, a device for moving the right or left seat portion, a space formed under the seat in the car body for receiving therein a bed with a disable person, and a holding plate provided in the car body for holding the device for moving the seat portion, the device for moving the seat portion having a link for connecting the seat portion to the car body, and an operation rod for operating the link so that the seat portion is moved between an opened position and a closed position.

A further object of the present invention is to provide a wheelchair comprising a car body, wheels for supporting the car body, a seat to be divided into right and left seat portions, a rear wall of the car body and a bottom wall under the seat of the car body being opened, a device for moving the right or left seat portion, a space formed under the seat in the car body for receiving therein a bed with a disable person, a brake for the wheel, a brake operation device, and a holding plate provided in the car body for holding the device for moving the seat portion, the device for moving the seat portion having a link for connecting the seat portion to the car body, and an operation rod for operating the link so that the seat portion is moved between an opened position and a closed position.

Yet a further object of the present invention is to provide a wheelchair, wherein the brake operation device for operating the brake has an L-shaped lever rotatably supported by the car body, one end of which is connected to the brake, and the other end of which is connected to a cable for rotating the L-shaped lever.

A still further object of the present invention is to provide a wheelchair, further comprising a device for driving the seat moving device and the brake operation device, synchronously.

Another object of the present invention is to provide a wheelchair, wherein the device for driving synchronously the seat moving device and the brake operation device has a lever, a lower end of which is supported rotatably by the car body, an upper portion of which is guided along a curved guide grove formed on the car body, a cable for connecting the lever to the seat moving device, a cable for connecting the lever to the brake operation device, and a restoration spring, so that when the lever is moved against the spring, the seat portion is opened and the brake is applied to the wheel, synchronously.

According to the wheelchair of the present invention, a seat can be divided into two portions and opened and closed easily and a brake can be applied to the wheel, so that a disable person can be moved easily with safe into and out of the wheelchair.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

Figure 1:
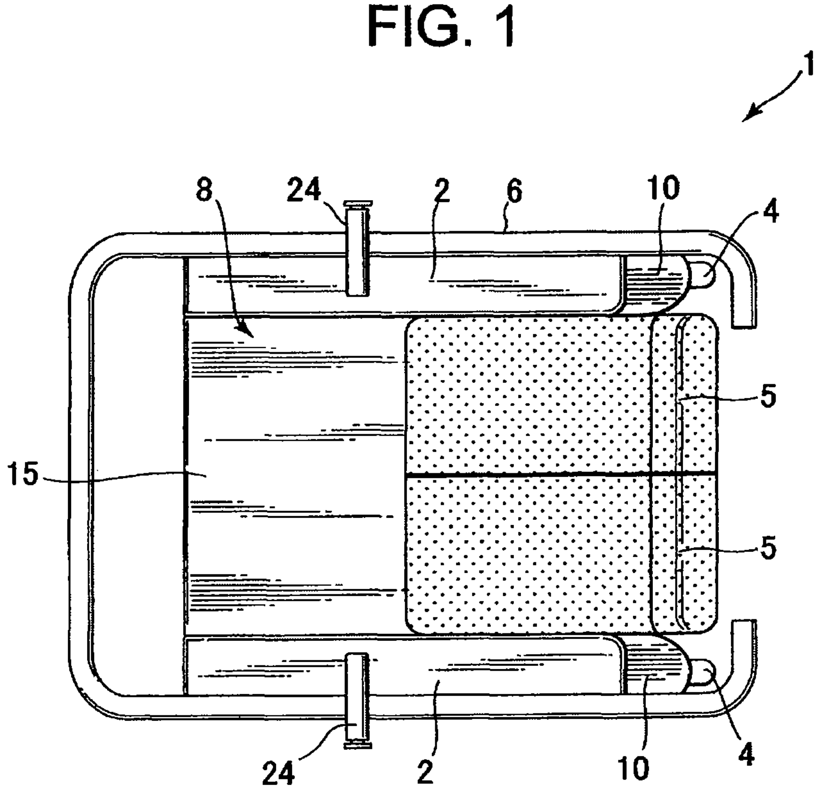
FIG. 1 is a plan view of a wheelchair according to the present invention with a seat closed.

Embodiments of a wheelchair according to the present invention will be explained with reference to the drawings.

Embodiment 1

A wheelchair 1 of the present invention comprises, as shown in FIG. 1 to FIG. 4, a car body 2 with opened rear wall and opened bottom wall, front wheels 3 and rear wheels 4 for supporting the car body 2, right and left portions 5 of a seat, arranged in a rear portion of the car body 2, an upper rail 6 supported by the car body 2, a space 7 formed between an under surface of the seat and upper surfaces of the rear wheels 4, into which a bed for a disable person (not shown) can be entered, a space 8 for the disable person formed in a forward upper portion of the car body 2, devices 9 for moving the right and left seat portions 5 of the seat between an opened position and an closed position, respectively, holding plates 10 fixed to the car body 2 for holding the devices 9, respectively, brakes 11 for the front wheels 3, operation devices 12 for operating the brakes 11, and devices 13 for driving synchronously the devices 9 for moving the right and left portions 5 of the seat and the operation devices 12 for operating the brakes 11.

The car body 2 has right and left side walls 14 and a base plate 15 for connecting front and lower portions of the right and left side walls 14.

The front wheels 3 are driven by wheel motors (not shown), respectively.

Figure 3:
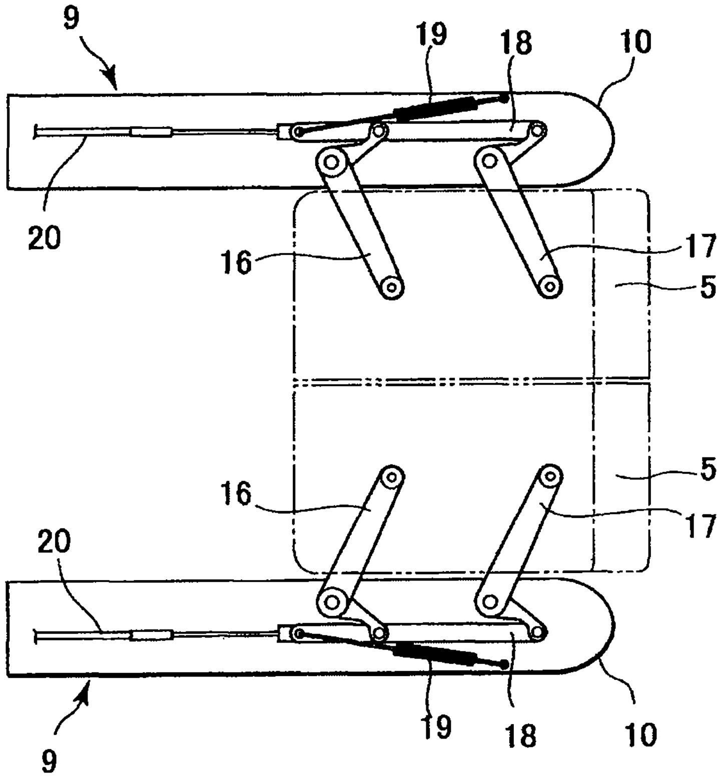
FIG. 3 is a plan view of a device for opening and closing the seat according to the present invention with the seat closed.

Each of the devices 9 for moving the right and left seat portions 5 of the seat comprises, as shown in FIG. 3, L-shaped first and second links 16 and 17 separated longitudinally from each other, an operation rod 18 extending longitudinally for operating the first and second links 16 and 17, a spring 19 for suppressing the motion of the operation rod 18, and a cable 20 for pulling the operation rod 18 longitudinally against the force of the spring 19.

Figure 5:
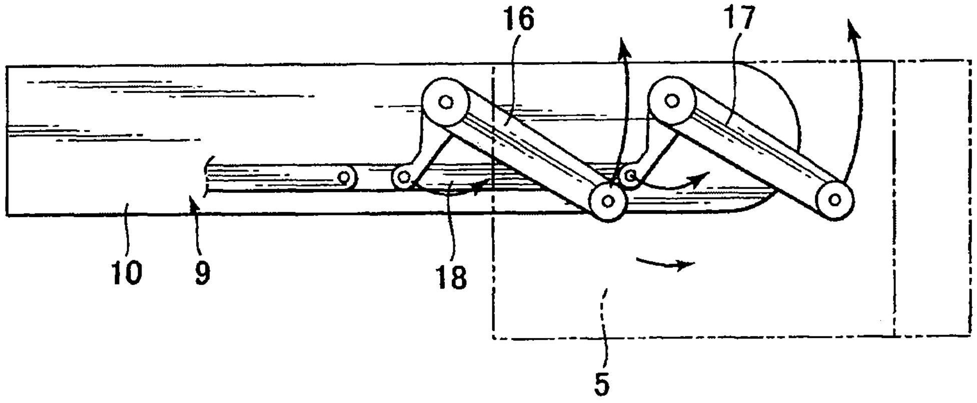
FIG. 5 is a plan view of a device for opening and closing the right side seat portion according to the present invention with the seat portion opened.

A bent portion of each of the L-shaped levers 16 and 17 is supported rotatably on the holding plate 10. One of free ends of each of the L-shaped levers 16 and 17 is pivoted to the operation rod 18, and the other of free ends of each of the L-shaped levers 16 and 17 is pivoted to the right or left seat portion 5 of the seat, so that when the operation rod 18 is pulled in the leftward direction in FIG. 3 through the cable 20 against the force of the spring 19, the links 16 and 17 are rotated by 90 degrees centering around each of the bent portion thereof on a horizontal surface, and that the right or left seat portion 5 of the seat is moved outwardly from a closed position shown in FIG. 3 to an opened position shown in FIG. 5.

Figure 4:
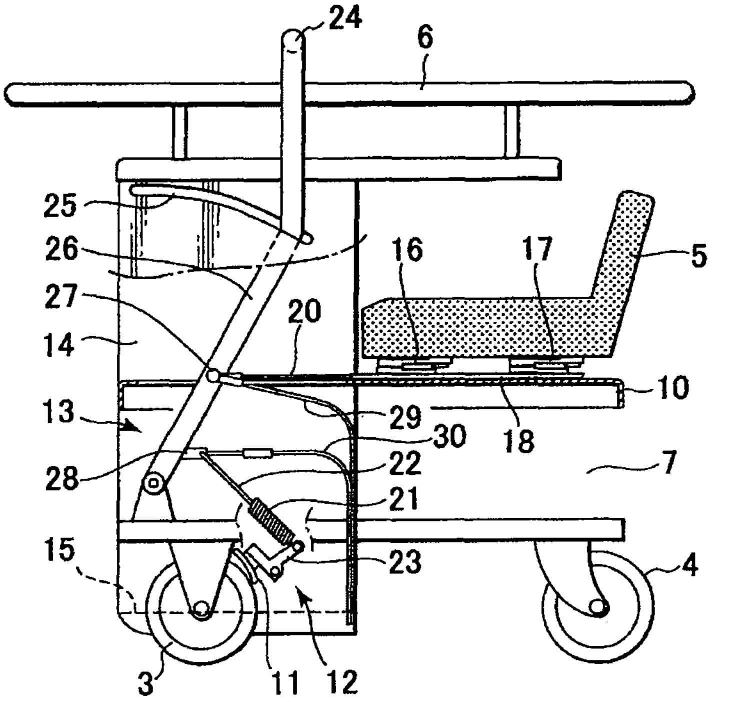
FIG. 4 is a right side view of the right side device for driving the seat and the brake, synchronously, according to the present invention.

Each of the operation devices 12 for operating the brakes 11 in the present invention comprises, as shown in FIG. 4, an L-shaped lever 23, a bent portion of which being supported rotatably by the side wall 14 of the car body 2, one of free ends of the L-shaped lever 23 holding the brake 11 for the front wheel 3, and the other of free ends of the L-shaped lever 23 being connected to a brake operation cable 22 through a tension spring 21.

Figure 2:
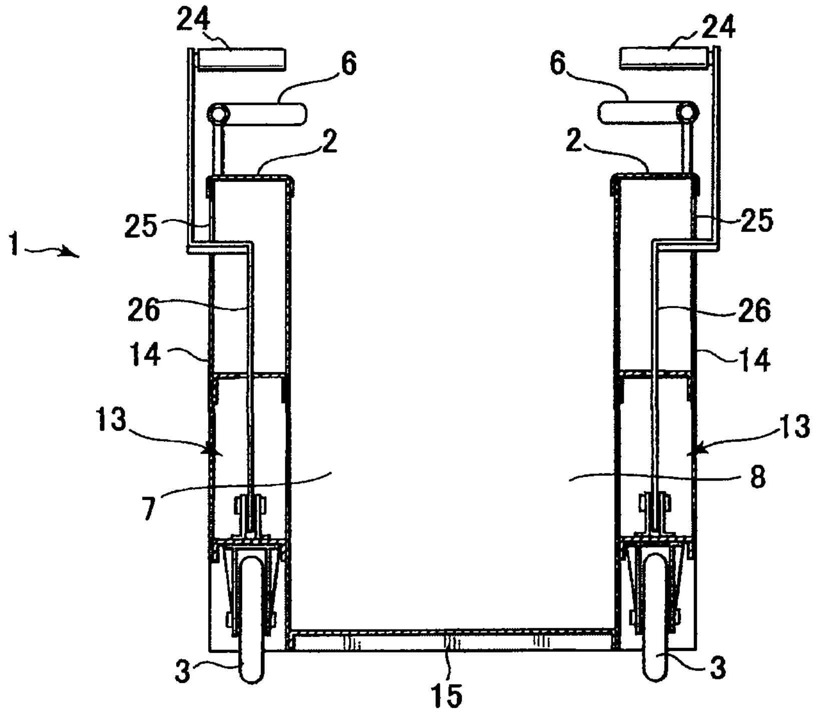
FIG. 2 is a front view of devices for driving the seat and brakes according to the present invention with the seat being omitted.

Each of the operation devices 13 for driving the devices 9 for moving the right and left seat portions 5 of the seat comprises, as shown in FIG. 2 and FIG. 4, a synchronous drive lever 26, a connecting portion 27 provided on an intermediate portion of the lever 26 for connecting the lever 26 and the cable 20 for pulling the operation rod 18, a connecting portion 28 provided on a lower portion of the lever 26 for connecting the lever 26 and the brake operation cable 22, and restoration plate springs 29 and 30 for restoring the lever 26.

A lower end of the synchronous drive lever 26 is supported rotatably by the lower portion of the side wall 14, and an upper portion of the synchronous drive lever 26 is guided by a curved guide groove 25 formed on the upper portion of the side wall 14.

A hand operation lever 24 is connected to the top of the synchronous drive lever 26.

An upper end of the restoration plate spring 29 is connected to the connecting portion 27 and a lower end of the restoration plate spring 29 is fixed to the lower portion of the side wall 14.

An upper end of the restoration plate spring 30 is connected to the connecting portion 28 and a lower end of the restoration plate spring 30 is fixed to the lower potion of the side wall 14.

Figure 6:
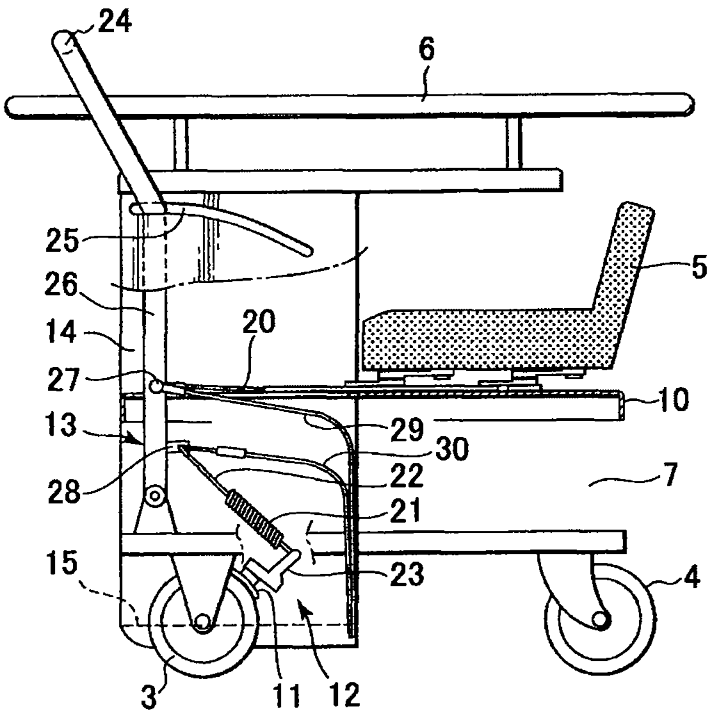
FIG. 6 is the right side view of the right side device for driving the seat and the brake, synchronously according to the present invention.

When the hand operation lever 24 in each of the devices 13 is moved by hand from a position shown in FIG. 4 to a position shown in FIG. 6, the synchronous drive lever 26 is rotated in the counter-clockwise direction centering around the lower end thereof along the curved guide groove 25, against the spring forces of the springs 19, 21, 29 and 30, so that the seat portions 5 of the seat are opened and the brake 11 is brought into contact with the front wheel 3.

It is preferable that the synchronous drive lever 26 can be fixed in the position shown in FIG. 6 by a fixing device (not shown).

The drive lever 26 may be moved by an electric motor.

In the wheelchair of the present invention, if the hand operation lever 24 is released, the synchronous drive lever 26 is shifted from the position shown in FIG. 6 to the position shown in FIG. 4, the synchronous drive lever 26 is rotated in the clockwise direction centering around the lower end thereof along the curved guide groove 25, by the spring forces of the springs 19, 21, 29 and 30, so that the seat portions 5 of the seat are closed and the brake 11 is separated from the front wheel 3.

Embodiment 2

Figure 7:
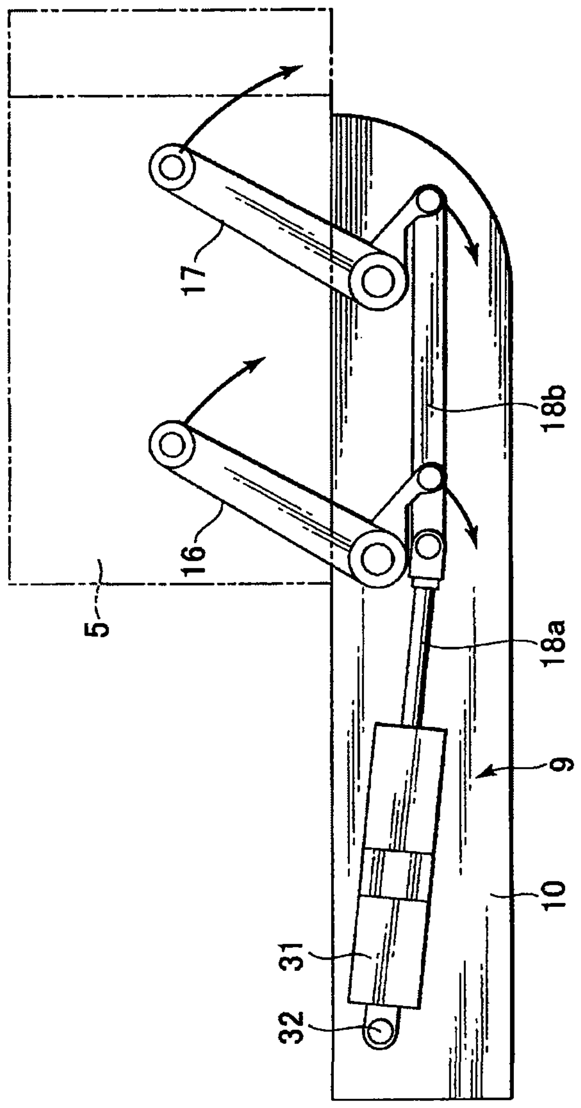
FIG. 7 is a plan view of a device for opening and closing the right side seat portion according to the other embodiment of the present invention with the seat portion opened.
Figure 8:
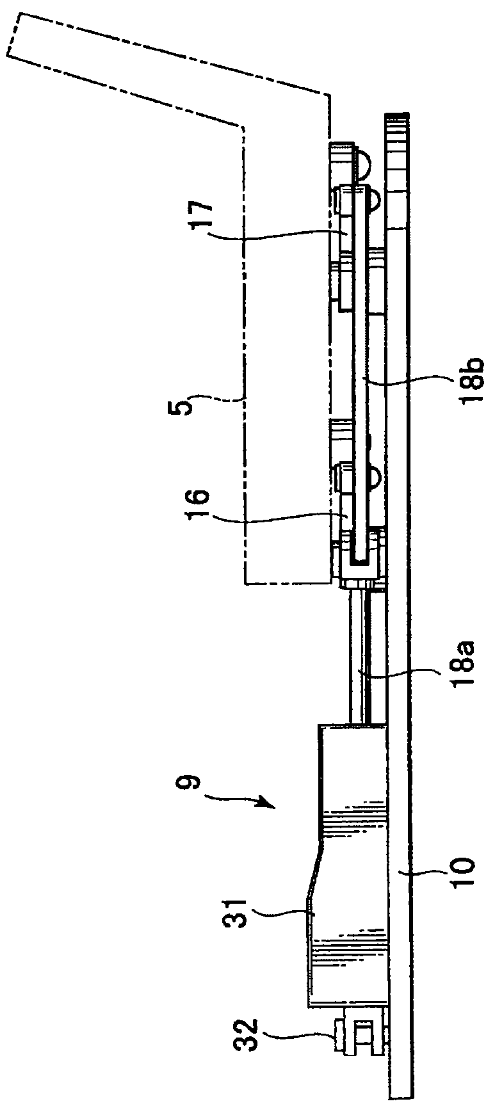
FIG. 8 is a side view of the device shown in FIG. 7.

Each of the devices 9 for moving the right and left seat portions 5 of the seat in an embodiment 2 of the present invention comprises, as shown in FIG. 7 and FIG. 8, an actuator 31, such as an electric hoist, a pivot shaft 32 for holding rotatably a base end of the actuator 31 on the holding plate 10, a first operation rod **18*a* operated by the actuator 31 so as to extend outwards from the actuator 31, and a second operation rod 18*b*, one end of which being connected rotatably to an outer end of the first operation rod 18*a*, and L-shaped first and second links 16 and 17** separated longitudinally from each other.

Figure 9:
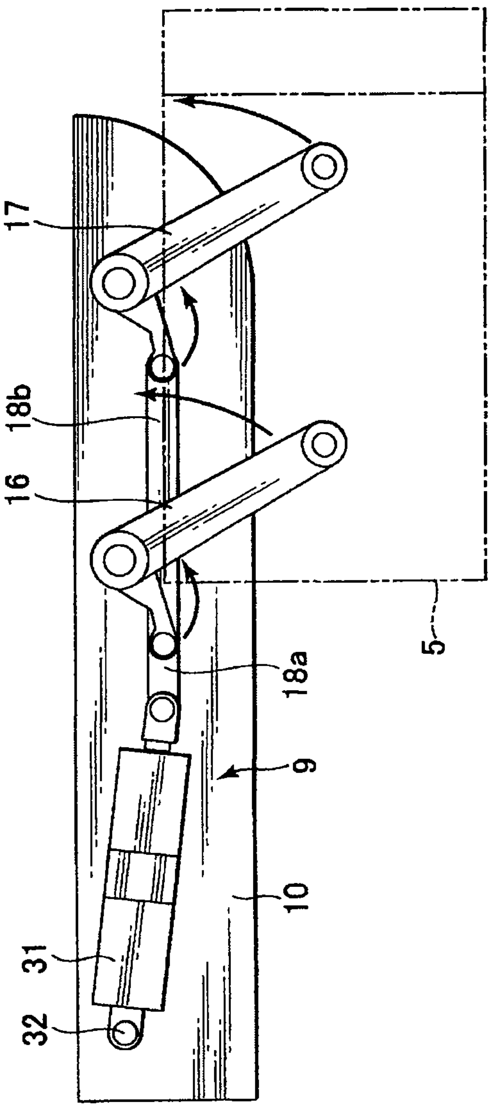
FIG. 9 is a plan view of the device for opening and closing the right side seat portion according to the other embodiment of the present invention with the seat portion opened.

A bent portion of each of the L-shaped levers 16 and 17 is supported rotatably on the holding plate 10. One of free ends of each of the L-shaped levers 16 and 17 is pivoted to the second operation rod **18*b* and the other of free ends of each of the L-shaped levers 16 and 17 is pivoted to one of the right and left seat portions 5 of the seat, so that when the first and second operation rods 18*a* and 18*b* are pulled in the leftward direction in FIG. 7 by the actuator 31, the links 16 and 17 are rotated by 90 degrees centering around each of the bent portion thereof on a horizontal surface, and that the right or left seat portion 5 of the- seat is moved outwardly from a closed position shown in FIG. 7 to an opened position shown in FIG. 9**.

In the wheelchair according to the embodiment 2 of the present invention, if the front side of the car body 2 can be opened, the disable person can be introduced into the car body 2 from the front side of the car body.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A wheelchair comprising:

a car body;

wheels for supporting the car body;

a seat to be divided into right and left seat portions, a rear wall of the car body and a bottom wall under the seat of the car body being opened;

a device for moving the right or left seat portion, a space being formed under the seat in the car body for receiving therein a bed with a disable person;

a brake tier the wheel;

a brake operation device;

a holding plate provided in the car body for holding the device for moving the seat portion, the device for moving the seat portion having a link for connecting the seat portion to the car body, and an operation rod for operating the link so that the seat portion is moved between an opened position and a closed position; and a device for driving the seat moving device and the brake operation device synchronously, wherein the device for driving synchronously the seat moving device and the brake operation device has a lever, a lower end of which is supported rotatably by the car body, an upper portion of which is guided along a curved guide groove formed on the car body, a cable for connecting the lever to the seat moving device, a cable for connecting the lever to the brake operation device, and a restoration spring, so that when the lever is moved against the spring, the seat portion is opened and the brake is applied to the wheel, synchronously.

2. A wheelchair comprising:

a car body that has an open rear wall and an open bottom;

wheels that support the car body;

a seat that is disposed over the bottom of the car body and that includes tightwad left seat portions;

a seat moving device for moving at least one of the right and left seat portions relative to the other of the left and right seat the seat moving device haying a link for connecting the seat portion to the car body, wherein a space is formed in the car body under the seat for receiving therein a bed supporting a disabled person;

a brake that brakes at least one of the wheels;

a brake operation device;

a holding plate that is provided in the car body and that holds the seat moving device;

an operation rod for operating the link so that the seat portion is moved between an opened position and a closed position;

and a device for synchronously driving the seat moving device and the brake operation device; wherein the device for synchronously driving comprises a lever and first and second cables, wherein a lower portion of the lever is supported rotatably by the car body and an upper portion of the lever is guided along a curved guide groove formed on the car body, wherein the first cable connects the lever to the seat moving device, and wherein the second cable connects the lever to the brake operation device; and further comprising a restoration spring that resists movement against the lever such that, when the lever is moved against the restoration spring, the seat portion is opened and the brake is synchronously applied to the wheel.

* * * * *

UNITED STATES PATENT AND TRADEMARK OFFICE

CERTIFICATE OF CORRECTION

PATENT NO. : 8,636,298 B2
APPLICATION NO. : 13/197039
DATED : January 28, 2014
INVENTOR(S) : Nimura It is certified that error appears in the above-identified patent and that said Letters Patent is hereby corrected as shown below:

IN THE CLAIMS

CLAIM 1 Replace "tier" with "for"
Col. 5, Line 21

CLAIM 2 Replace "tightwad" with "right and"
Col. 6, Line 8

CLAIM 2 Add "portion," after "right seat"
Col. 6, Line 11

Signed and Sealed this
Twenty-ninth Day of April, 2014

Michelle K. Lee

Michelle K. Lee
*Deputy Director of the United States Patent and Trademark Office*